United States Patent
Stowers et al.

(10) Patent No.: US 7,617,357 B2
(45) Date of Patent: Nov. 10, 2009

(54) SYSTEM AND METHOD FOR UPDATING HARD DISK WRITE PARAMETERS IN THE FIELD

(75) Inventors: Steven Stowers, Dacula, GA (US); Bohdan Prus, Alpharetta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 609 days.

(21) Appl. No.: 11/275,623

(22) Filed: Jan. 19, 2006

(65) Prior Publication Data
US 2008/0126875 A1    May 29, 2008

(51) Int. Cl.
*G06F 12/00* (2006.01)
*G06F 11/00* (2006.01)
(52) U.S. Cl. ........................... 711/111; 714/42
(58) Field of Classification Search .............. None
See application file for complete search history.

(56) References Cited

U.S. PATENT DOCUMENTS

| | | | | |
|---|---|---|---|---|
| 6,101,053 A | * | 8/2000 | Takahashi | 360/46 |
| 6,188,531 B1 | * | 2/2001 | Chang et al. | 360/46 |
| 6,574,754 B1 | * | 6/2003 | Smith | 714/47 |
| 2002/0114092 A1 | * | 8/2002 | Yang | 360/31 |

* cited by examiner

*Primary Examiner*—Reginald G Bragdon
*Assistant Examiner*—Baboucarr Faal
(74) *Attorney, Agent, or Firm*—Merchant & Gould

(57) ABSTRACT

Systems and methods are provided for updating a temperature table for a disk subsystem in a client system using information provided by a server system. In one embodiment, among others, the client receives an update command from the server system. The update command comprises instructions to update the temperature table. The client updates the temperature table in the disk subsystem in accordance with the update command. The client selects one of the write current values in the temperature table based on a disk subsystem temperature, and writes data to the disk subsystem using the selected write current values.

20 Claims, 7 Drawing Sheets

SYSTEM AND METHOD FOR UPDATING HARD DISK WRITE PARAMETERS IN THE FIELD

CROSS REFERENCE TO RELATED APPLICATIONS

Not applicable.

FIELD OF THE DISCLOSURE

The present disclosure relates to hard disk parameters, and more specifically, to a system and method for updating hard disk write parameters.

BACKGROUND

The use of a hard disk (also known as a "hard drive") to store large amounts of data was pioneered in the personal computer (PC). The hard disk is now common in some types of consumer electronics devices, ones that access large amounts of data. The physical environment in which a consumer electronics device operates can be more harsh than the PC environment, and this can lead to hard disk failures.

A PC usually includes a fan which provides cooling, and is typically placed in a location that provides some airflow or ventilation. In contrast, some types of consumer electronics devices are often placed at the back of a bookshelf, and may not include a fan because of cost or space limitations. Thus, the ambient temperature inside the consumer electronics device can be much higher than in a PC.

Read and write operations in the hard disk are affected by temperature. For example, the amount of current needed to magnetize the platter decreases with temperature. Thus, if the write current is not adjusted, too much current will be applied when the temperature rises, and adjacent areas will be magnetized too. This leads to data errors.

For these reasons, a hard disk designed for use in a PC may not operate properly when used in a consumer electronics device. Failure of a device in the field can be expensive if a return to the manufacturer is required. Thus, a need arises to address the above-mentioned problems, among others.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The systems and methods for updating hard disk write parameters in the field can be implemented in software, hardware, or a combination thereof. In some embodiments, the system and/or method is implemented in software that is stored in a memory and that is executed by a suitable microprocessor (µP) situated in a network device. However, system and/or method, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
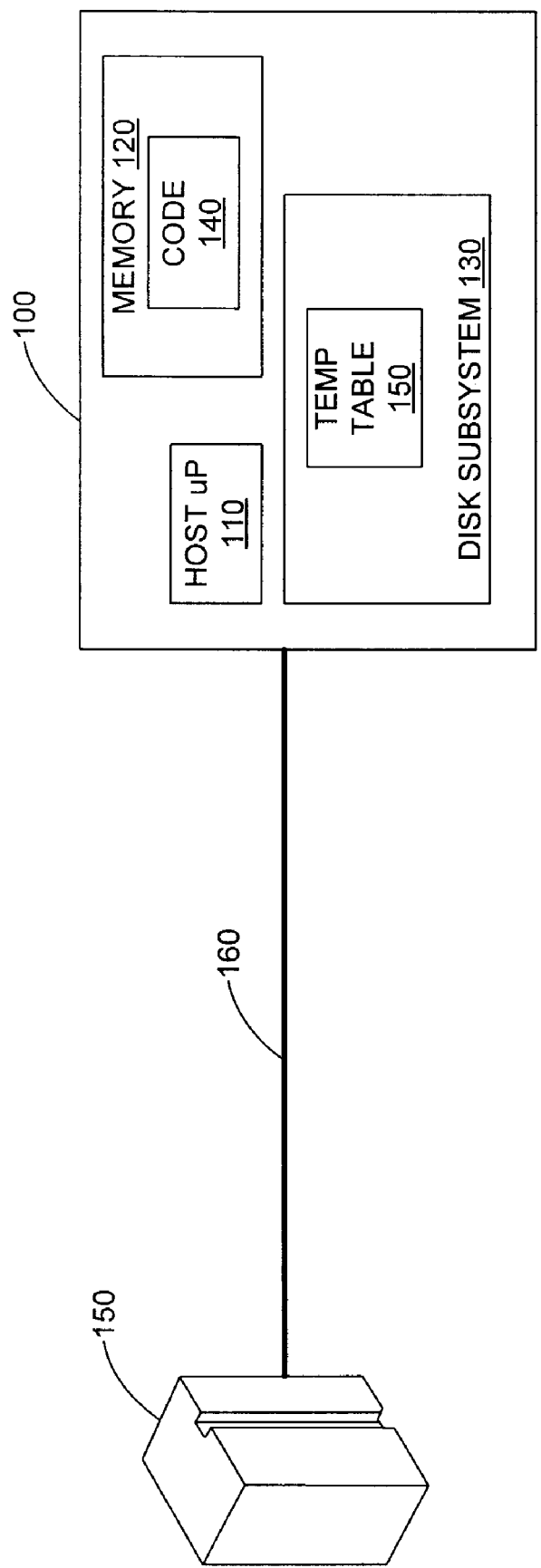
FIG. 1 is block diagram of the environment of the system and method for updating hard disk write parameters in the field.

FIG. 1 is block diagram of the environment of the system and method for updating hard disk write parameters in the field. Consumer electronic device 100 includes a host processor 110, memory 120, a hard disk subsystem 130. The memory 120 includes code 140 that is executed by the host processor 110. Included within the hard disk subsystem 130 is a temperature table 150. Entries in the temperature table 150 determine the write current value used by the hard disk subsystem 130 when recording data. As explained earlier, adjusting write current to compensate for temperature allows optimum performance in a hard disk subsystem 130.

The consumer electronic device 100 is in communication with a server 160 over communication channel 170. Through this channel 170, the server 160 can communicate a new temperature table 150 to the consumer electronic device 100. In this manner, the temperature table 150 of a consumer electronic device 100 in the field can be changed if the factory default table proves to be unsatisfactory in a particular consumer environment.

In one embodiment, the communication channel 170 is bi-directional, and the consumer electronic device 100 can inform the server 160 about errors experienced by the hard disk subsystem 130. Such errors might indicate that the temperature table 150 in use in the consumer electronic device 100 should be replaced with a table with different values.

The system and method for updating hard disk write parameters in the field is applicable to a wide range of consumer electronic devices 100 and communication channels 170. An exemplary, but non-exhaustive, list of devices includes set-top units for cable or satellite television, digital video recorders, digital music players, and digital cameras. An exemplary, but non-exhaustive, list of channels includes hybrid fiber-coax (HFC) cable, satellite, analog or digital telephone line, and wireless technologies.

Figure 2:
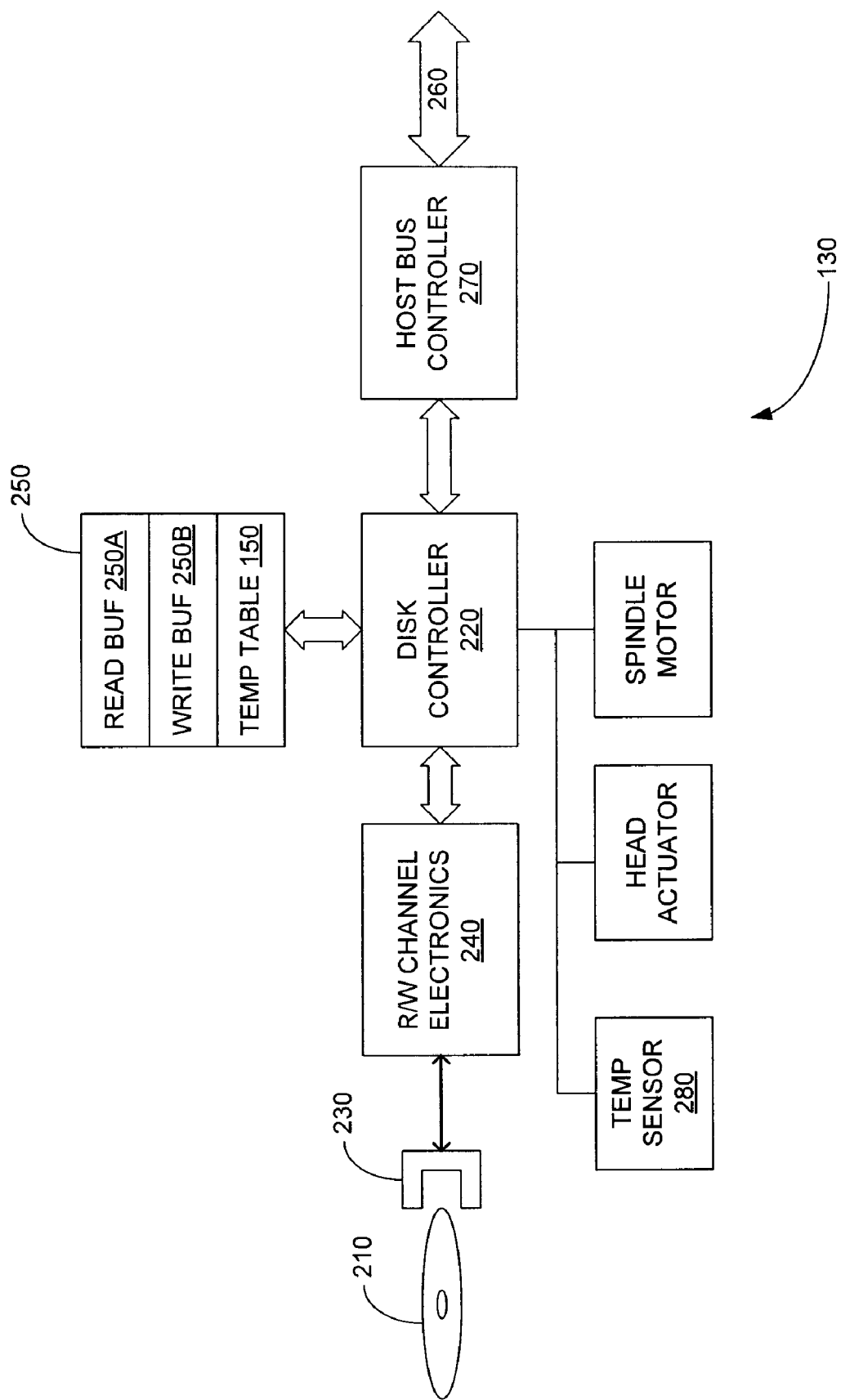
FIG. 2 is a hardware block diagram showing more detail on the hard disk subsystem 130.

FIG. 2 is a hardware block diagram showing more detail on the hard disk subsystem 130 of FIG. 1. Data is stored in magnetic form on a platter 210 which rotates on a spindle (not shown). A disk controller 220 precisely positions a head 230 over the spinning platter 210, and read/write channel electronics 240 reads or writes data at this position by either detecting current in, or supplying current to, the head 230. Once read, data bits are stored in memory 250 in a read buffer 250A. Similarly, data bits to be written by read/write channel 240 are stored in a write buffer 250B.

Data is communicated between the hard disk subsystem 130 and the host processor 110 (FIG. 1) via a host bus 260. A host bus controller 270 is responsible for transferring data to be recorded into the write buffer 250B, and for transferring data read by the read/write channel 240 into the read buffer 250B.

Memory 250 also contains various types of configuration and parameter information, including the temperature table 150. The write current value used by the head 230 depends on the temperature table 150 and on the ambient temperature as measured by a temperature sensor 280. The temperature sensor 280 can take many different forms, including but not limited to a semiconductor sensor and a thermistor.

Figure 3A:
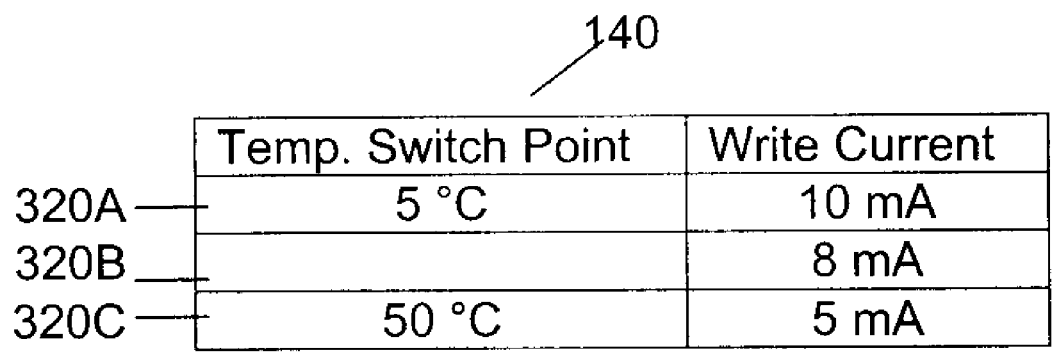
FIGS. 3A-B show several embodiments of a temperature table 150.

FIG. 3A shows an exemplary embodiment of a temperature table 150 from FIG. 1, which contains three entries, 310A-C. Each entry 310 has two fields: a temperature switch point 320 and a write current value 330. In this embodiment, the switch point 320 in each entry implies a temperature range, and when the ambient temperature falls within that range, the read/write channel 240 applies the write current value 330 given by that same entry to the head 230.

Figure 3B:
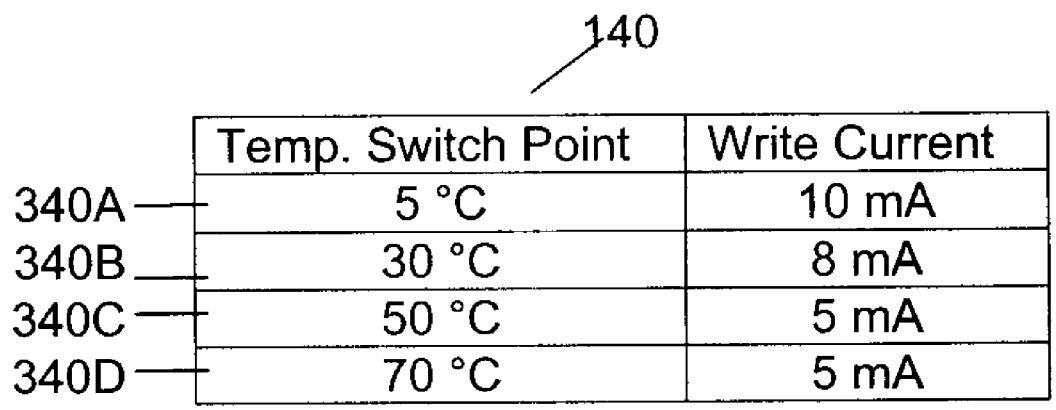

Table 150 has three entries (310A-C), and defines three temperature ranges. The temperature value in the first switch point, 320A, specifies the top end of a "cold" range. Thus, when the ambient temperature is below switch point 320A, the write current value 330A is applied. The third switch point, 320C, specifies the bottom end of a "hot" range, so that the write current value 330C is applied when the ambient temperature is above switch point 320C. The middle switch point, 320B, has no temperature value, only a write current value 330B. This write current value 330B is applied when the ambient temperature is between switch point 320A and switch point 320C. Thus the example table of FIG. 3A specifies the following operation: 10 mA at t<5° C.; 8 mA at 5-50° C.; 5 mA at >=70° C.;

FIG. 3B shows a different embodiment of the table, temperature table 150'. Table 150' has four entries (340A-D) and defines four ranges. The first switch point, 350A, defines a "cold" range (<5° C.). The next switch point, 350B, defines a "low" range (5-30° C.). The next switch point, 350C, defines a "medium" range (30-50° C.). The final switch point, 350C, defines a "high" range (50-70° C.).

In another variation, temperature table 150 includes temperature switch points, but not write current values. In this variation, temperature ranges can be shifted, but the write current values are fixed by the read/write channel 240 (or the disk controller 220). A person of ordinary skill in the art will understand that many implementations are possible for a table specifying temperature ranges and associated write current values. All such implementations are intended to be covered by the claims herein.

Figure 4:
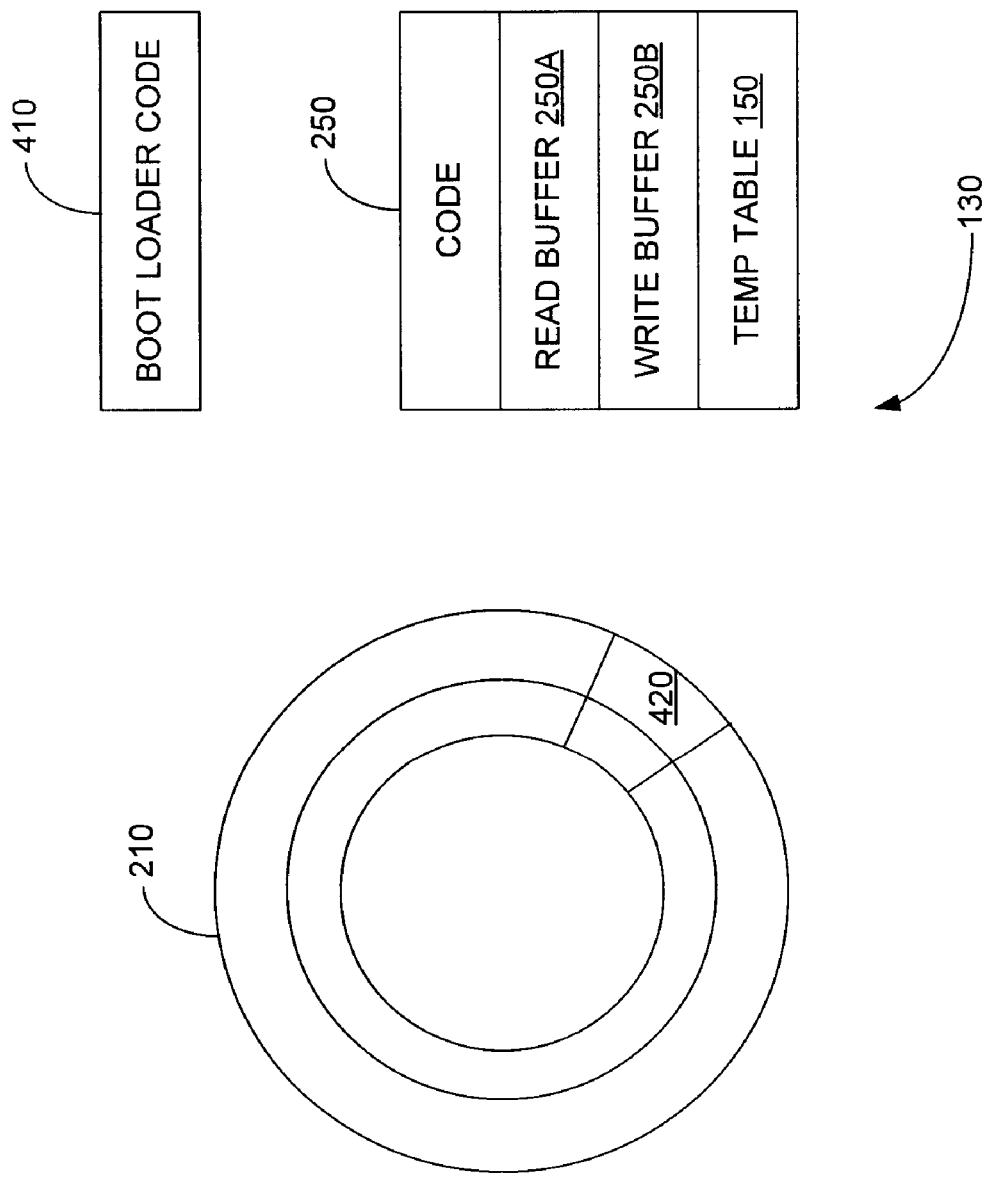
FIG. 4 is another block diagram of the hard disk subsystem 130, focusing on how the temperature table is loaded from, and stored onto, the platter 210.

FIG. 4 is another block diagram of the hard disk subsystem 130, focusing on how the temperature table is loaded from, and stored onto, the platter 210. The platter 210 is divided into sectors. Most sectors store user data from the host bus 260, but some sectors ("boot sectors") store code and data used by the disk controller 220. Code and data on boot sectors are loaded as follows.

When the consumer electronic device 100 boots, the disk controller 220 executes a relatively small portion of code from non-volatile memory 410. This "boot loader" code reads a larger section of code from one or more boot sectors into the memory 250.

After this code is loaded into the memory 250, the disk controller 220 begins executing code from the memory 250 rather than the non-volatile memory 410. In one embodiment, non-volatile memory 410 is flash memory, and memory 250 is dynamic RAM.

Also during boot, the disk controller 220 loads another sector (420), containing the temperature table, into the temperature table portion of memory (150). As explained earlier, the disk controller 220 and/or read/write channel 240 uses entries in the temperature table 150 to determine the write current value used when recording data.

Importantly, the hard disk subsystem 130 allows the host processor 110 to change the contents of the in-memory temperature table 150, and to write this in-memory temperature table 150 to the temperature table sector 420. In one embodiment, the host processor 110 changes the temperature table 150 (in-memory and on disk) by sending a series of low-level, vendor-specific commands to the hard disk subsystem 130 over the host bus 260. These commands will now be discussed in more detail.

Figure 5:
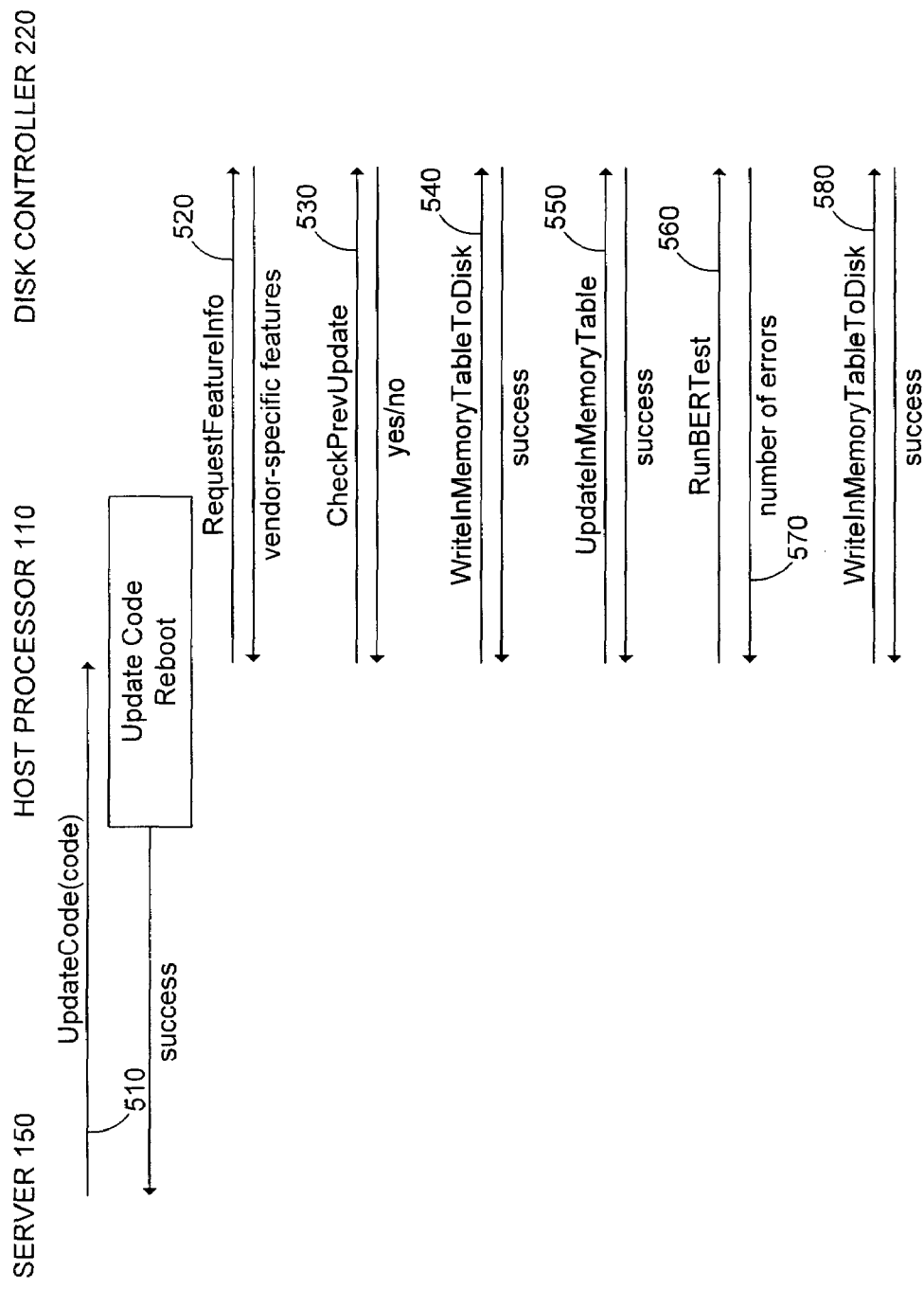
FIGS. 5-7 are data flow diagrams illustrating the interaction between the server 160 and the consumer electronic device 100 when effecting an update of the temperature table 150.

The update of the temperature table 150 involves interaction between the server 160 and the consumer electronic device 100. Several different embodiments will now be described, which differ the degree of interaction between the server 160 and the consumer electronic device 100. One such embodiment is shown in the data flow diagram of FIG. 5.

At event 510, the server 160 sends an UpdateCode command to the consumer electronic device 100. Along with the command, the server 160 sends a code image. The command may replace the entire code 140, or a portion thereof. In response to the UpdateCode command 510, the host processor 110 updates code 140 with the code image, and then reboots. At the next boot, the executing code 140 includes code to update the temperature table 150.

At event 520, the host processor 110 requests feature information from the disk controller 220. Using this feature information, the host processor 110 determines whether the disk controller 220 allows updates to the temperature table 150, and what vendor-specific commands are used to perform the update.

Next, at event 530, the host processor 110 requests information from the disk controller 220 enabling the host processor 110 to determine whether a previous update has occurred. In one embodiment, this process includes requesting the disk controller 220 to look for a marker on the temperature table sector 420. If no update has yet occurred, at event 540 the host processor 110 commands the disk controller 220 to write the in-memory temperature table 150 to a file on the hard disk subsystem 130. This saved version of the original temperature table 150 can be restored if the updated table does not work as desired. If the disk controller 220 returns with a success code, then at event 550 the host processor 110 commands the disk controller 220 to change one or more table entries in the in-memory temperature table 150. The update values are contained in the code image provided by the server 160 with the UpdateCode command.

If the disk controller 220 returns with a success code, then at event 560 the host processor 110 commands the disk controller 220 to run a bit-error-rate (BER) test. The disk controller 220 reports back the number of errors at event 570.

The host processor 110 compares the number of errors to a threshold. If the reported errors are less than the threshold, then the temperature table in memory can be saved permanently to disk. If the reported errors exceed the threshold, an abort procedure is followed, in which the in-memory temperature table 150 is reloaded from the temperature table sector 420. If the reported errors do not exceed the threshold, at event 580 the host processor 110 commands the disk controller 220 to write the in-memory temperature table 150 to the temperature table sector 420.

Figure 6:
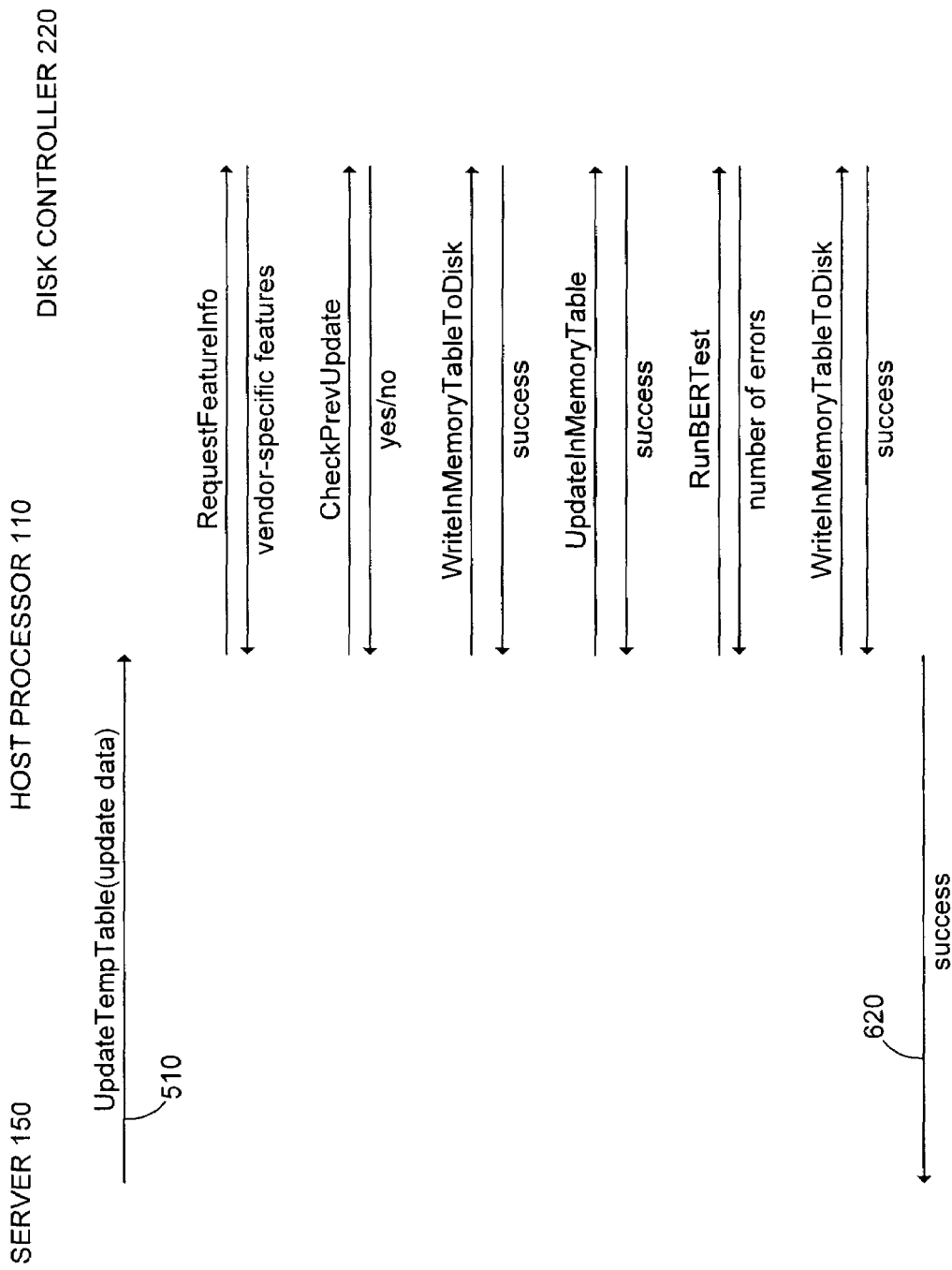

In the embodiment just described, the server 160 sends an UpdateCode command, and a portion of the updated code includes code to update the temperature table 150, as well as update values for the table. An alternative embodiment is shown in FIG. 6. In this embodiment, the server 160 sends (at event 610) an UpdateTempTable command to the consumer electronic device 100. Along with the command, the server 160 sends update data, which may include a new table to replace the existing one, or relative changes to the existing table (e.g., increase first entry by 5° C.).

The commands used by the host processor 110 to interact with the disk controller 220 are the same as described earlier in connection with FIG. 5. If the disk controller 220 returns with a success code after writing the in-memory temperature table 150 to the temperature table sector 420, then at event 620 the host processor 110 in the consumer electronic device 100 notifies the server 160 that the UpdateTempTable command has succeeded.

Figure 7:
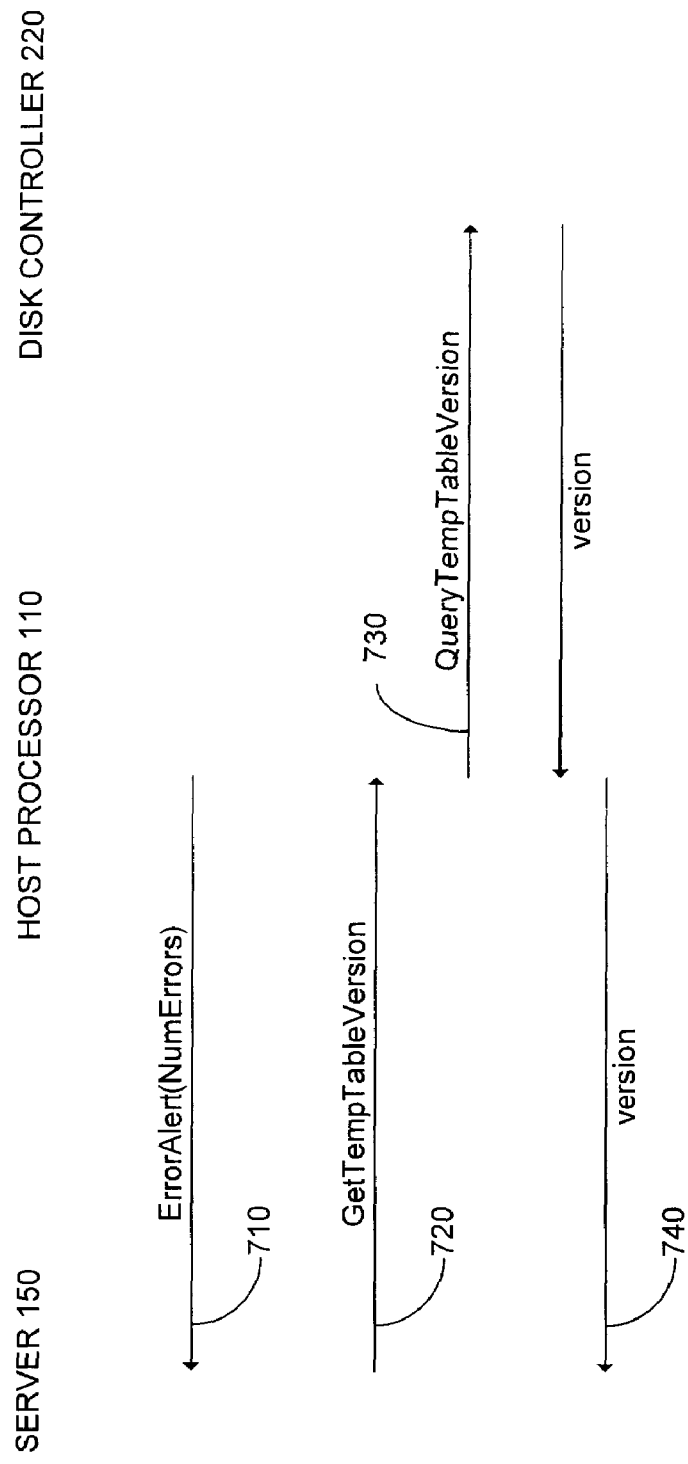

Yet another embodiment of the update process is shown in FIG. 7. At event 710, the consumer electronic device 100 indicates to the server 160 that a threshold number of errors have occurred with the hard disk subsystem 130. The server 160, at event 720, sends a GetTempTableVersion command to consumer electronic device 100. At event 730, the host processor 110 queries the disk controller 220 for information about the version of temperature table stored at temperature table sector 420. This version information is returned back to the server 160, and the server 160 uses the version information to determine whether or not to perform a UpdateTempTable command, which then proceeds as shown in FIG. 6.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen and described to illustrate the principles of the disclosure and its practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

What we claim is:

1. A client computer, in communication with a server computer system, the client computer comprising:
    a processor;
    a memory;
    a disk subsystem comprising:
        memory storing a temperature table containing a plurality of entries, each entry including a temperature, each temperature associated with a write current value;
        a platter; and
        a disk controller configured to determine, based on a disk subsystem temperature, which one of the write current values is used during recording;
    wherein the processor is configured to:
        receive an update command from the server computer system, the update command comprising instructions to update the temperature table;
        save the temperature table to the platter before the temperature table in the disk subsystem memory is updated;
        update the temperature table in the disk subsystem memory in accordance with the update command;
        test for errors on the disk subsystem after the temperature table in the disk subsystem memory is updated; and
        responsive to errors above a threshold, restore the temperature table in disk subsystem memory using the entries saved on the disk subsystem.

2. The client computer of claim 1, wherein the disk controller is configured to, responsive to a command from the processor, determine whether a marker has been written to the platter, the marker indicating that a temperature table update has occurred.

3. The client computer of claim 1, wherein the disk subsystem comprises read/write channel electronics configured to record information onto the platter using a selected one of the write current values in the temperature table.

4. The client computer of claim 3, wherein the disk subsystem comprises a temperature sensor providing the disk subsystem temperature, and the read/write channel electronics is configured to select one of the write current values in the temperature table based on the provided temperature.

5. The client computer of claim 1, wherein each entry in the temperature table contains the write current value associated with the temperature in the entry.

6. A client computer, in communication with a server computer system, the client computer comprising:
    a processor;
    a memory;
    a disk subsystem comprising:
        memory storing a temperature table containing a plurality of entries, each entry including a temperature, each temperature associated with a write current value;
        a platter; and
        a disk controller configured to:
            determine, based on a disk subsystem temperature, which one of the write current values is used during recording;
            responsive to a first command from the processor, write the temperature table in the disk subsystem memory to the platter;
            responsive to a second command from the processor, test for errors on the disk subsystem; and
            responsive to a third command from the processor, restore the temperature table in the disk subsystem memory using the entries saved on the platter;
    wherein the processor is configured to:
        receive an update command from the server computer system, the update command comprising instructions to update the temperature table; and
        update the temperature table in the disk subsystem memory in accordance with the update command.

7. The client computer of claim 6, wherein the disk controller is configured to, responsive to a command from the processor, determine whether a marker has been written to the platter, the marker indicating that a temperature table update has occurred.

8. The client computer of claim 6, wherein the disk subsystem comprises read/write channel electronics configured to record information onto the platter using a selected one of the write current values in the temperature table.

9. The client computer of claim 8, wherein the disk subsystem comprises a temperature sensor providing the disk subsystem temperature, and the read/write channel electronics is further configured to select one of the write current values in the temperature table based on the provided temperature.

10. The client computer of claim 6, wherein each entry in the temperature table contains the write current value associated with the temperature in the entry.

11. A method of updating a temperature table for a disk subsystem in a client system using information provided by a server system, the temperature table containing a plurality of entries, each entry including a temperature, each temperature associated with a write current value used by the disk subsystem during recording, the method comprising the steps of:
receiving, from the server system, an update command, the update command comprising instructions to update the temperature table;
updating the temperature table in the disk subsystem in accordance with the update command;
selecting one of the write current values in the temperature table based on a disk subsystem temperature;
writing data to the disk subsystem using the selected write current values;
saving the temperature table to a platter in the disk subsystem before updating a disk subsystem memory containing the temperature table;
testing for errors on the disk subsystem after the temperature table in the disk subsystem memory is updated; and
responsive to errors above a threshold, restoring the temperature table in the disk subsystem memory using the entries saved on the platter.

12. The method of claim 11, further comprising:
determining whether the temperature table has been updated; and
responsive to the determination, notifying the server.

13. The method of claim 11, further comprising sending a command to a disk controller in the disk subsystem, the command operative to determine whether a marker has been written to the disk subsystem, the marker indicating that a temperature table update has occurred.

14. The method of claim 11, further comprising measuring a disk subsystem temperature.

15. The method of claim 11, wherein each entry in the temperature table contains the write current value associated with the temperature in the entry.

16. A method of updating a temperature table for a disk subsystem in a client system using information provided by a server system, the temperature table containing a plurality of entries, each entry including a temperature, each temperature associated with a write current value used by the disk subsystem during recording, the method comprising the steps of:
receiving, from the server system, an update command, the update command comprising instructions to update the temperature table;
updating the temperature table in the disk subsystem in accordance with the update command;
selecting one of the write current values in the temperature table based on a disk subsystem temperature;
writing data to the disk subsystem using the selected write current values;
sending a first command to a disk controller in the disk subsystem, the command operative to write the temperature table to a platter in the disk subsystem;
responsive to a second command from the processor, test for errors on the disk subsystem; and
responsive to a third command from the processor, restore the temperature table in disk subsystem memory using the entries saved on the disk subsystem.

17. The method of claim 16, further comprising:
determining whether the temperature table has been updated; and
responsive to the determination, notifying the server.

18. The method of claim 16, further comprising sending a command to a disk controller in the disk subsystem, the command operative to determine whether a marker has been written to the disk subsystem, the marker indicating that a temperature table update has occurred.

19. The method of claim 16, further comprising measuring a disk subsystem temperature.

20. The method of claim 16, wherein each entry in the temperature table contains the write current value associated with the temperature in the entry.

* * * * *

UNITED STATES PATENT AND TRADEMARK OFFICE
CERTIFICATE OF CORRECTION

PATENT NO. : 7,617,357 B2 Page 1 of 1
APPLICATION NO. : 11/275623
DATED : November 10, 2009
INVENTOR(S) : Stowers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Nineteenth Day of October, 2010

David J. Kappos
*Director of the United States Patent and Trademark Office*